(12) United States Patent
Chan et al.

(10) Patent No.: US 6,360,230 B1
(45) Date of Patent: *Mar. 19, 2002

(54) METHOD AND SYSTEM FOR UNIFORMLY ACCESSING MULTIPLE DIRECTORY SERVICES

(75) Inventors: Chuck Y. Chan; Krishna Ganugapati, both of Bellevue; Margaret K. Johnson, Kirkland; Steven G. Judd, Redmond; Stuart L. S. Kwan, Bellevue; Colin Watson, Issaquah, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/195,568

(22) Filed: Nov. 18, 1998

Related U.S. Application Data

(63) Continuation of application No. 08/674,318, filed on Jul. 1, 1996, now Pat. No. 5,893,107.

(51) Int. Cl.[7] ............................................. G06F 17/30
(52) U.S. Cl. ..................... 707/103; 703/104.1; 709/316
(58) Field of Search ................................ 707/104, 200, 707/103, 316; 709/221, 316

(56) References Cited

U.S. PATENT DOCUMENTS

| 5,485,617 A | * | 1/1996 | Stutz et al. | 709/315 |
| 5,491,817 A | | 2/1996 | Gopal et al. | 707/200 |
| 5,497,463 A | | 3/1996 | Stein et al. | 709/203 |

(List continued on next page.)

FOREIGN PATENT DOCUMENTS

| EP | 0 213 276 A2 | 3/1987 |
| EP | 0 661 651 A1 | 7/1995 |

OTHER PUBLICATIONS

W. Yeong et al., Lightweight Directory Access Protocol, Request for Comments: 1777, University of Michigan, IDS-SODE Consortium, pp. 1–22, Mar. 1995.

M. Wahl et al., Lightweight Directory Access Protocol, Internet–Draft, University of Michigan, IDSODE Consortium, Feb. 1996.

(List continued on next page.)

*Primary Examiner*—Thomas Black
*Assistant Examiner*—Charles L. Rones
(74) *Attorney, Agent, or Firm*—Klarquist Sparkman, LLP

(57) ABSTRACT

The present invention provides a directory service system for accessing a plurality of directory services in a uniform manner. Each directory service manages information relating to objects of that directory service. The type of information that a directory service manages for an object is defined by the object class of the object. An object class defines the properties (i.e., information) that a directory service manages for objects of that object class. Each property has a property name and property type. A directory service has a property value for each property defined by the object class of each object. The directory service system comprises a schema browsing component, a name resolving component, a binding component, and an extending component. The schema browsing component controls the retrieving of the property name and property type of each property of each object class of each directory service. A client of the directory service system uses the schema browsing component to retrieve property names and property types of the object classes. The name resolving component controls the receiving of a unique identifier of an object within a directory service and the locating of the object within the directory service. The binding component controls the binding to an in-memory object representing a located object within a directory service. The extending component controls the defining of new object classes and new properties for each directory service. A client of the directory service system uses the extending component to define new object classes and new properties.

34 Claims, 11 Drawing Sheets

U.S. PATENT DOCUMENTS

| | | | | | |
|---|---|---|---|---|---|
| 5,548,726 | A | * | 8/1996 | Pettus | 1/23 |
| 5,581,760 | A | * | 12/1996 | Atkinson et al. | 717/2 |
| 5,588,147 | A | * | 12/1996 | Neeman et al. | 707/1 |
| 5,600,831 | A | | 2/1997 | Levy et al. | 707/2 |
| 5,649,194 | A | * | 7/1997 | Miller et al. | 707/200 |
| 5,675,787 | A | * | 10/1997 | Miller et al. | 707/104 |
| 5,682,478 | A | * | 10/1997 | Watson et al. | 709/229 |
| 5,682,532 | A | * | 10/1997 | Remington et al. | 709/316 |
| 5,689,662 | A | | 11/1997 | Nakajima et al. | 345/746 |
| 5,692,180 | A | | 11/1997 | Lee | 707/10 |
| 5,805,885 | A | * | 9/1998 | Leach et al. | 709/316 |
| 5,812,784 | A | * | 9/1998 | Watson et al. | 709/227 |
| 5,893,107 | A | * | 4/1999 | Chan et al. | 707/103 |
| 5,911,066 | A | * | 6/1999 | Williams et al. | 709/310 |
| 6,016,499 | A | * | 1/2000 | Ferguson | 707/104 |

OTHER PUBLICATIONS

T. Howes et al., LDAP Application Program Interface, Request for Comments: 1823, Universtiy of Michigan, pp. 1–22, Aug. 1995.

Kraig Brockschmidt, Inside OLE, Second Edition, Microsoft Press, Table of Contents, Chapter 14, 1995.

CAE Specification: API to Directory Services (XDS), X/Open Company LTD., Chapter 1–5, 1991.

IEEE Standard for Information Technology—Test Methods for Measuring Conformance to Directory Services—Application Program Interface (API) [Language Independent], 1362.2–1993, IEEE Std: Information Tech. p. 1–243, Feb. 2, 1994.

IEEE Standard for Information Technology—Directory Services—Application Program Interface (API) [Language Independent], 1224.2–1993, IEEE Std: Information Tech p. 1–164, Feb. 2, 1994.

IEEE Standard for Information Technology—Test Methods for Measuring Conformance to Directory Services C Language Interfaces—Binding for Application Program Interface (API), 1328.2–1993, IEEE Std: Information Tech. p. 1–62, Feb. 2, 1994.

"ODSI: A Multiple Directory Service API–When you Can't Eat Just One (Directory), Eat Them All!", Network Computing, pp. 127, Nov. 1995.

"Mircosoft: Microsoft Demonstrates Next Generation Directory Services", M2 Communications, Jun. 1996.

Robertson, Bruce, "Too Many Directories and Too Many Applications", Network Computing, V6, N14, p. 119 (2), Nov. 1, 1995.

"The Open Software Foundation Finally Gets Moving Again on a String of New Projects", Computergram International, Jan., 1996.

"Dueling Standards: X/Open, Microsoft Offer Competing APIs for Directory Access", Information Week, p. 57, Jan. 8, 1996.

"OLE Developments Kits to Combat Directory Chaos", PC Week, p. 1, May 13, 1996.

Federated Naming: The XFN Specification, X/Open Company, Ltd., Table of Contents, Chapters 4–5, Apendices B–C, 1994.

Ellis, et al., "The Annotated C++ Reference Manual," Addison–Wesley Publishing Company, p. 113–116, Apr. 1994.

IEEE Standard for Information Technology—Directory Services C Interfaces—Binding for Application Program Interface (API), 1327.2–1993, IEEE Std. Information Tech. p. 1–98, Feb. 2, 1994.

"Too Many Directories and Too Many Applications," Network Computing, p. 119, Nov. 1, 1995.

* cited by examiner

METHOD AND SYSTEM FOR UNIFORMLY ACCESSING MULTIPLE DIRECTORY SERVICES

RELATED APPLICATION DATA

This patent application is a continuation of U.S. patent application Ser. No. 08/674,318, filed Jul. 1, 1996, which issued on Apr. 6, 1999, as U.S. Pat. No. 5,893,107.

TECHNICAL FIELD

This invention relates to computer-based directory services and, more particularly, to a method and system for uniformly accessing the directory services.

BACKGROUND OF THE INVENTION

Computer systems typically store and maintain a large amount of data relating to the computer system and its users. For example, a computer system may maintain names, email addresses, and phone numbers of the user of the computer system. The computer system may also maintain information relating to the various printers connected to the computer system. This information may include printer characteristics (e.g., laser and color) and names of the users who are authorized to use each printer. Several different types of computer programs, known as "clients," may need access to this information. For example, one client may be a computer program that needs to determine which printers can be used to print a document in color. Another client may be a computer program that allows a system administrator to update the information, for example, to reflect information relating to a newly added printer. Computer systems have traditionally stored such information in a variety of locations and formats. For example, information relating to a printer may be stored in a configuration file and information relating to a user may be stored in a database. Thus, it was typically very difficult for a programmer who was developing a client to even know where to look for, let alone know how to access, this information.

Some computer systems provide a directory service to help in the storing and maintaining of this information. A directory service provides a repository of this information from which a client can access over the network. Directory services generally refer to the things (e.g., users, printers, or access groups) for which information is maintained as "objects." Directory services organize such objects hierarchically into a directory. That is, one object, referred to as a container object, may contain various other objects referred to as contained objects. For example, an access group that comprises users who share common access rights to a resource is a container object that contains users that are contained objects. Each object for which a directory service maintains information has a unique identifier (e.g., a name) by which a client can identify the object. Although directory services were originally developed to maintain information relating to computer systems, they may be used to maintain information unrelated to computer systems. For example, a directory service can be used by an airplane manufacturer to maintain a part list for the components and sub-components of an airplane.

FIG. 1 illustrates a sample hierarchy of a directory service. Each block represents an object of a particular "object class." For example, an object representing a company would have an object class named "company." Each object class defines the properties of objects of that object class. For example, the company object class may define the properties "name" and "address." Each object has a property value for each property defined for the object class. For example, an object of the company object class may have the property value "MS" for the name property. Block 101 corresponds to an object of the company object class and has a value for the name and address properties. Block 102 corresponds to an object of the division object class and has a value for the name of the division (e.g., "system"). Block 103 corresponds to an object of the user object class and has a value for the email address of the user. Because the directory service is hierarchically organized, each object can be uniquely identified by a path from the root to the object. For example, object 102 is uniquely identified by the path "Company=MS\Division=Systems". The directory service provides a conceptual finite space, referred to as a namespace, in which a given name can be resolved. The directory service unambiguously resolves paths to objects in the directory.

Various vendors provide directory service systems. Each vendor typically designs and implements an application programming interface (API) to allow clients to access its directory service system. Thus, each directory service system may, and typically does, have very different API sets. If a client needs to use different directory service systems, for example, because the client operates in an environment that includes personal computers and mainframe computers, the programmer of the client would need to know about the API sets of each directory service and design the client to support each of the API sets.

Although each API set is vendor-specific, the API sets generally provide similar functionality. The API sets generally includes functions for accessing property values of the objects and functions for defining new object classes. The functions for manipulating objects are, for example, OpenObject, ReadObject, WriteObject, ListObjects, CloseObject, CreateObject, and DeleteObject. The function OpenObject is passed the identification (e.g., path) to an object and returns a handle that identifies that object. This handle is subsequently used by the client to identify the open object to the directory service. The function OpenObject uses the identification to identify the object and then locates the properties of the identified object. The function ReadObject is passed a handle to an open object and a list of the names of the properties of that object that are to be retrieved. The function ReadObject returns the current property values for those properties. The function WriteObject is passed a handle to an open object and a list of property name and property value pairs. The function WriteObject sets each named property in the open object to the property value of the pair. The function ListObjects is passed a handle to an open object and returns a list containing the identification of each object that is contained within the open object. The function CloseObject is passed a handle to an open object and closes the object so that it can no longer be accessed with that handle. The function CreateObject is passed an object class, creates an object of the object class that is contained within the open object, and returns a handle to the contained object. The function DeleteObject is passed a handle to an open object and removes the open object from its container object.

The functions for defining the object classes are CreateObjectClass, DeleteObjectClass, CreateProperty, DeleteProperty, AddPropertyToObjectClass, DeletePropertyFromObjectClass, and ListPropertiesOfObjectClass. The function CreateObjectClass is passed the name of a new object class and creates a new object class. Once an object class is created, then a client can create objects of that object class. The function CreateProperty is passed the name of a property and the property type (e.g., integer or string) and creates a property of that property type (e.g., property name of "address" with property type of "string"). The function AddPropertyToObjectClass is passed the name of an object class and the name of a property and adds the named property as a property of the named object class. The function ListPropertiesOfObjectClass is passed the name of an object class and returns a list of the properties that have been added to that object class. The functions DeleteObjectClass, DeleteProperty, and DeletePropertyFromObjectClass perform the behavior suggested by their names.

The present invention is described below using some object-oriented techniques; thus, an overview of well-known object-oriented programming techniques is provided. (The term "object" has many different meanings when used in different contexts. In the remainder of the background, the term "object" is used in an object-oriented sense to refer to an in-memory data structure.) Two common characteristics of object-oriented programming languages are support for data encapsulation and data type inheritance. Data encapsulation refers to the binding of functions and data. Inheritance refers to the ability to declare a data type in terms of other data types. In the C++ language, data encapsulation and inheritance are supported through the use of classes. A class is a user-defined type. A class declaration describes the data members and function members of the class. A function member is also referred to as a method of a class. The data members and function members of a class are bound together in that the function operates on an instance of the class. An instance of a class is also called an object of the class. Thus, a class provides a definition for a group of objects with similar properties and common behavior.

To allocate storage for an object of a particular type (class), an object is instantiated. Once instantiated, data can be assigned to the data members of the particular object. Also, once instantiated, the function members of the particular object can be invoked to access and manipulate the data members. Thus, in this manner, the function members implement the behavior of the object, and the object provides a structure for encapsulating data and behavior into a single entity.

To support the concept of inheritance, classes may be derived from (based upon the declaration of) other classes. A derived class is a class that inherits the characteristics—data members and function members—of its base classes. A class that inherits the characteristics of another class is a derived class. A class that does not inherit the characteristics of another class is a primary (root) class. A class whose characteristics are inherited by another class is a base class. A derived class may inherit the characteristics of several classes; that is, a derived class may have several base classes. This is referred to as multiple inheritance.

A class may also specify whether its function members are virtual. Declaring that a function member is virtual means that the function can be overridden by a function of the same name and type in a derived class. If a virtual function is declared without providing an implementation, then it is referred to as a pure virtual function. A pure virtual function is a virtual function declared with the pure specifier, "=0". If a class specifies a pure virtual function, then any derived class needs to specify an implementation for that function member before that function member may be invoked. A class which contains at least one pure virtual function member is an abstract class.

FIG. 2 is a block diagram illustrating typical data structures used to represent an object. An object comprises instance data (data members) and function members, which implement the behavior of the object. The data structures used to represent an object comprise instance data structure 201, virtual function table 202, and the function members 203, 204, 205. The instance data structure 201 contains a pointer to the virtual function table 202 and contains data members. The virtual function table 202 contains an entry for each virtual function member defined for the object. Each entry contains a reference to the code that implements the corresponding function member. The layout of this sample object conforms to models described in U.S. Pat. No. 5,297,284, entitled "A Method for Implementing Virtual Functions and Virtual Bases in a Compiler for an Object Oriented Programming Language," which is hereby incorporated by reference. In the following, an object will be described as an instance of a class as defined by the C++ programming language. One skilled in the art would appreciate that other object models can be defined using other programming languages.

An advantage of using object-oriented techniques is that these techniques can be used to facilitate the sharing of objects. For example, a program implementing the function members of an instantiated object (a "server program") can share the object with another program (a "client program"). To allow an object of an arbitrary class to be shared with a client program, interfaces are defined through which an object can be accessed without the need for the client program to have access to the class definitions at compile time. An interface is a named set of logically related function members. In C++, an interface is an abstract class with no data members and whose virtual functions are all pure. Thus, an interface provides a published protocol for two programs to communicate. Interfaces are typically used for derivation: a program defines (implements) classes that provide implementations for the interfaces the classes are derived from. Thereafter, objects are created as instances of these derived classes. Objects instantiated from a derived class implementing particular interfaces are said to "support" the interfaces. An object supports one or more interfaces depending upon the desired functionality.

When a client program desires to share an object, the client program needs access to the code that implements the interfaces for the object (the derived class code). In the OLE 2.01 environment established by Microsoft Corporation of Redmond, Wash., to access the derived class code (also referred to as class code), each class implementation is given a unique class identifier (a "CLSID"). OLE 2.01 is described in "Inside OLE," $2^{nd}$ Edition, Microsoft Press, 1995, by Kraig Brockschmidt. For example, code implementing a spreadsheet object developed by Microsoft Corporation may have a class identifier of "MSSpreadsheet," while code implementing a spreadsheet object developed by another corporation may have a class identifier of "LTSSpreadsheet." A persistent registry in each computer system is maintained that maps each CLSID to the code that implements the class. Typically, when a spreadsheet program is installed on a computer system, the persistent registry is updated to reflect the availability of that class of spreadsheet objects. So long as a spreadsheet developer implements each function member defined by the interfaces to be supported by spreadsheet objects and so long as the persistent registry is maintained, the client program can access the function members of shared spreadsheet objects without regard to which server program has implemented them or how they have been implemented.

Since an object may support some interfaces and not others, a client program may need to determine at run time whether a particular object supports a particular interface. To enable this determination, every COM object supports the IUnknown interface, which contains a function member, QueryInterface, that indicates which interfaces are implemented for the object. The QueryInterface method is defined as follows:

virtual HRESULT QueryInterface (REFIID iid, void**ppv)=0

The QueryInterface method is passed an interface identifier in parameter iid (of type REFIID) and returns in parameter ppv a pointer to the implementation of the designated interface "iid." Thus, the QueryInterface method is typically coded to know about all available interfaces of the object to which it belongs. If the object does not support the interface, then the QueryInterface method returns false. The type HRESULT indicates a predefined status.

The IUnknown interface also defines the methods AddRef and Release, which are used to implement reference counting. Whenever a new reference to an interface is created, the AddRef method is invoked to increment a reference count of the object. When a reference is no longer needed, the Release method is invoked to decrement the reference count of the object and, when the reference count goes to zero, the object is deallocated.

SUMMARY OF THE INVENTION

The present invention provides a definition for OLE interfaces and a model for provider software for accessing a plurality of directory services in a uniform manner. Each directory service provider manages information relating to objects of that directory service. The type of information that a directory service manages for an object is defined by the object class of the object. An object class defines the properties (i.e., information) that a directory service manages for objects of that object class. Each property has a property name and property type. A directory service has a property value for each property defined by the object class of each object. The directory service system comprises a schema browsing component, a name resolving component, a binding component, and an extending component. The schema browsing component controls the retrieving of the property name and property type of each property of each object class of each directory service. A client of the directory service system uses the schema browsing component to retrieve property names and property types of the object classes. The name resolving component controls the receiving of a unique identifier of an object within a directory service and the locating of the object within the directory service. The binding component controls the binding to an in-memory object representing a located object within a directory service. The extending component controls the defining of new object classes and new properties for each directory service. A client of the directory service system uses the extending component to define new object classes and new properties.

DETAILED DESCRIPTION OF THE INVENTION

Figure 1:
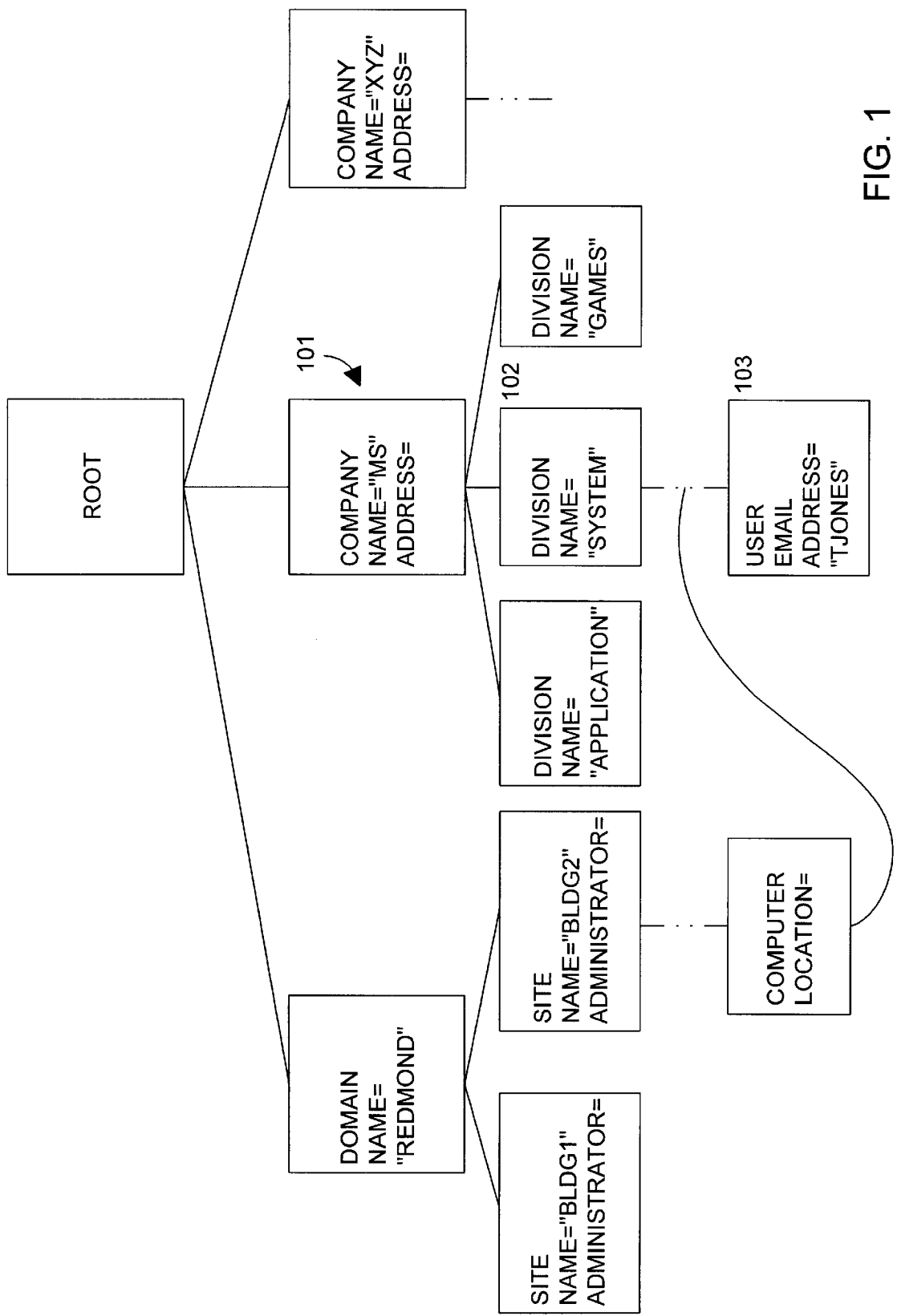
FIG. 1 illustrates a sample hierarchy of a directory service.
Figure 2:
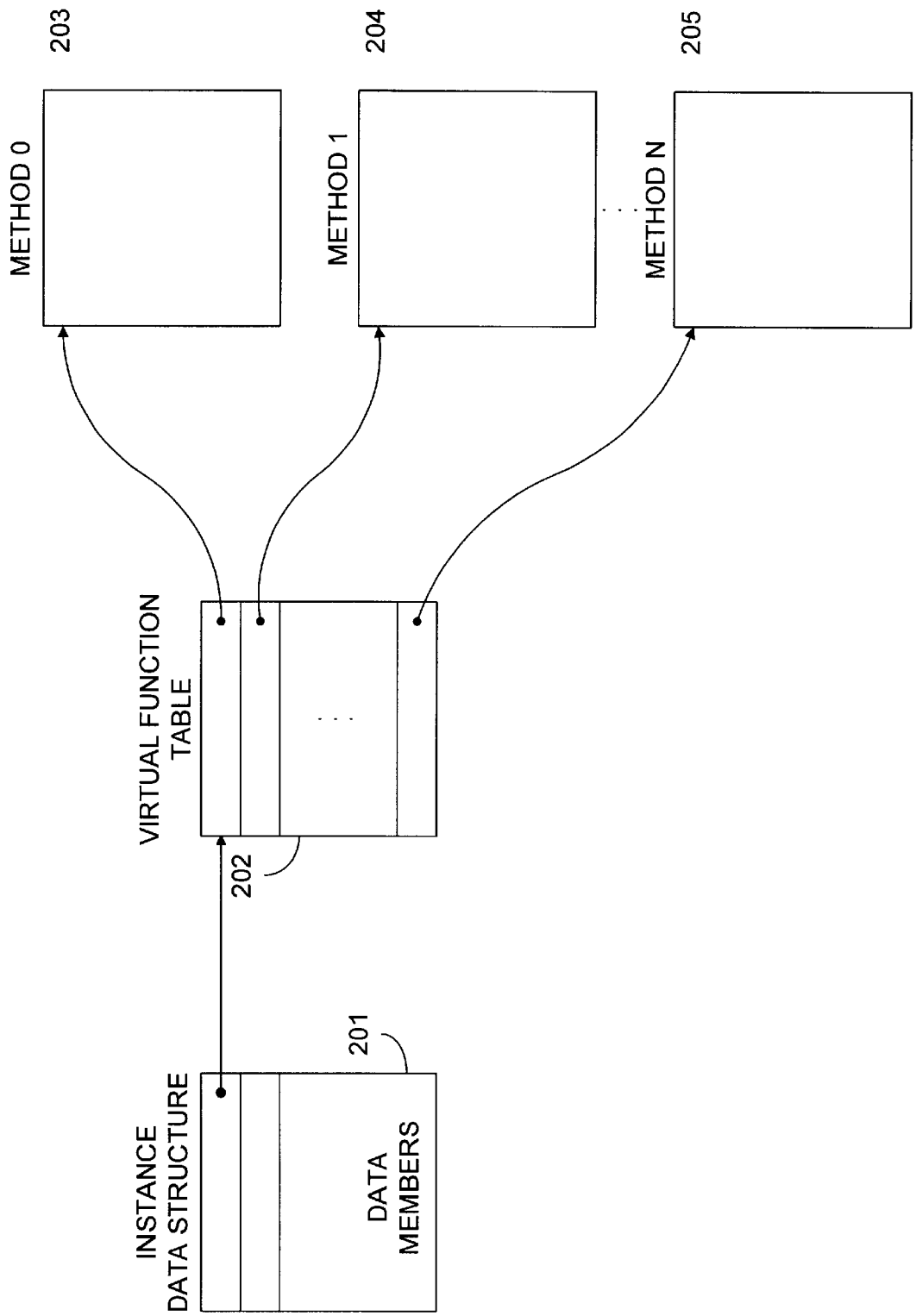
FIG. 2 illustrates typical data structures used to represent an object.

The present invention provides a framework for uniform access to various different directory services. In a preferred embodiment, the directory service system, referred to as OleDs, provides an architecture that allows clients to access the contents of these various directory services using a single, common set of OleDs objects, attributes, and interfaces. An OleDs object is an in-memory data structure that corresponds to an object of a directory service or to an object class of the directory service. When an OleDs object corresponds to an object, it provides an interface for accessing the property values and methods of that object. When an OleDs object corresponds to an object class, it provides an interface for accessing the definition of that object class. Each provider of a directory service provides an implementation of these interfaces for their directory service that maps the behavior of their API set to the behavior of these OleDs interfaces. In this way, a client that is developed to use the OleDs architecture can access each of these directory services, regardless of the differences in their API sets.

OleDs models all directory services as being within a root container object, referred to as a "namespaces" container. FIG. 3 illustrates the namespaces container. The objects within the namespaces container represent the various directory services. OleDs provides an interface for enumerating the directory services contained within the namespaces container. Each contained directory service is represented by an OleDs namespace container object. A client can use the interface to discover the existence of a directory service and can access its schema to determine the definition of the object classes of the directory service. The schema contains a definition of the object classes of the directory service. Through the interfaces provided by OleDs, a client can discover at run time the existence of and contents of directory services that were not known at compile time.

Since each directory service typically has its own convention for naming its objects, OleDs provides a uniform naming convention that uniquely identifies each object in the various directory services without conflict. The unique identifier is referred to as an OleDs path. The OleDs path is a character string that identifies the directory service and the set of nested container objects that need to be opened to access the identified object. The OleDs has the following format:

@NamespaceIdentifier!<namespace path to object> or

NamespaceIdentifier://<namespace path to object>

The "NamespaceIdentifier" uniquely identifies the directory service. The string after the "!" or ":" is in a directory service-dependent format. That is, each directory service can define its own format.

OleDs provides a binding function for binding an OleDs path to an OleDs object that corresponds to the object identified by the OleDs path. This binding function is passed an OleDs path and returns a pointer to the OleDs object corresponding to the object. To bind to the OleDs object, the binding function parses the namespace identifier from the OleDs path. The binding function uses this namespace identifier to retrieve code (e.g., in a dynamic linked library) that implements access to the identified namespace. (OleDs maintains a registry for directory service providers to register the location of their implementation of OleDs interfaces.) The binding function then invokes the retrieved code passing the OleDs path. The invoked code uses the API set of the directory service to access the identified object and implement the behavior defined by the OleDs interface.

OleDs models the objects of each directory service as either OleDs container objects and OleDs leaf objects. To access a container object of a directory service, an OleDs container object is instantiated that has an implementation provided by the provider of the directory service. Similarly, to access a leaf object of the directory service, an OleDs leaf object is instantiated that has an implementation provided by the provider of the directory service. Each OleDs object exposes an interface for accessing the properties of the corresponding object of the directory service. Each OleDs container object also exposes an interface through which its contained objects can be accessed by a client.

Figure 4:
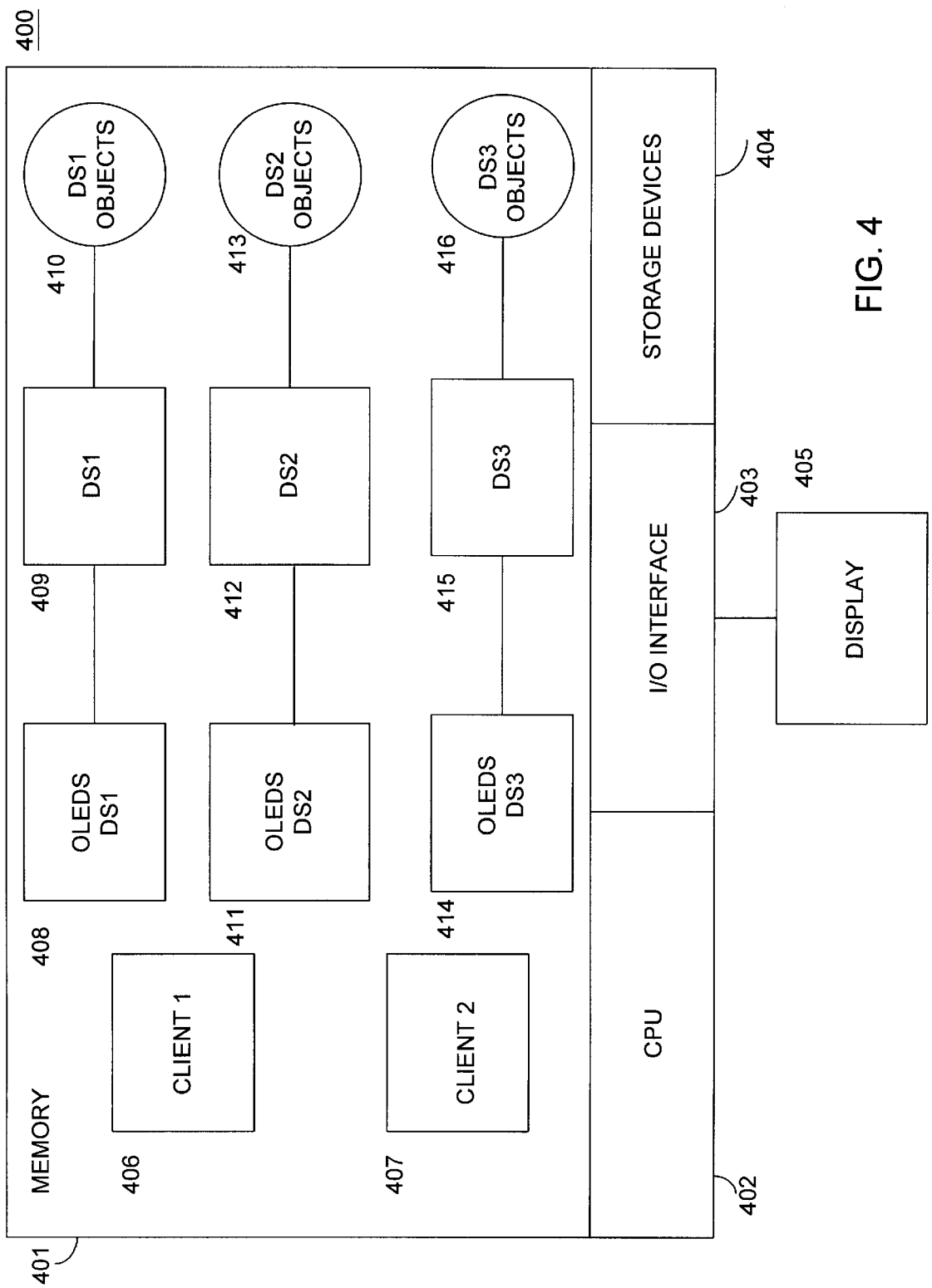
FIG. 4 is a block diagram of a computer system configured to implement the present invention.

FIG. 4 illustrates the relationship between OleDs objects and their corresponding objects in a directory service. Each directory service provider provides implementations of each interface exposed by the OleDs objects. These implementations effect a mapping of the behavior of the provider's API set to the behavior of the OleDs interfaces. Each client can thus uniformly access multiple directory service using the providers' implementations of the OleDs interfaces.

To assist clients in accessing the objects of a directory service, OleDs defines a model for representing the schema of each directory service. Conceptually, each directory service is viewed as having a schema container object that contains a schema object for each object class. The schema object defines the properties of the object class. The schema container is assigned a pre-defined name within the namespace, such as "schema." To access a schema container, a client uses the OleDs binding function passing the OleDs path of the schema (e.g., "@WinNTDS!Schema"). The OleDs binding function returns a pointer to an OleDs container object corresponding to the schema container object. A client can use to interfaces of the OleDs container object to enumerate the contained schema objects. In this way, a client can determine the definition of the various object classes at run time. In addition, a client can define additional object classes by adding schema objects to the schema container object.

OleDs pre-defines several object classes to facilitate the implementation of the mapping of the behavior of a directory service API set to the behavior of the OleDs interfaces. In particular, OleDs provides object class definitions for common container objects, such as organizational unit and country, and for common leaf objects, such a user or a resource.

OleDs defines the concept of a default namespace or directory service. A default namespace is that namespace that a client wishes to use when a namespace is not specified in the OleDs path. The identification of the default namespace for a client or user would be typically stored in the registry indexed by the client or user.

OleDs also defines the concept of a default OleDs object that is implemented by each provider to allow a client to add objects of a newly defined object class to the directory service. A directory service provider would typically provide an implementation of an OleDs object for each object class within the directory service. For example, a provider may provide different implementations for the object classes for a computer object and company object. Each implementation is aware of which properties are defined for the corresponding object class and can request the API set to retrieve the values of the properties. However, if a client defines a new object class at run time, there will be no corresponding implementation. Consequently, each provider that allows new object classes to be defined for its directory service, also provides an implementation of a default OleDs object. Whenever a client requests to instantiate an OleDs object for an object for which there is no implementation, a default OleDs object is instantiated. The default OleDs object contains the name of the object class to which it corresponds, which it uses to retrieve the definition of the object class from the schema. Using this definition, the default OleDs object can access the corresponding object of the directory service.

Figure 3A:
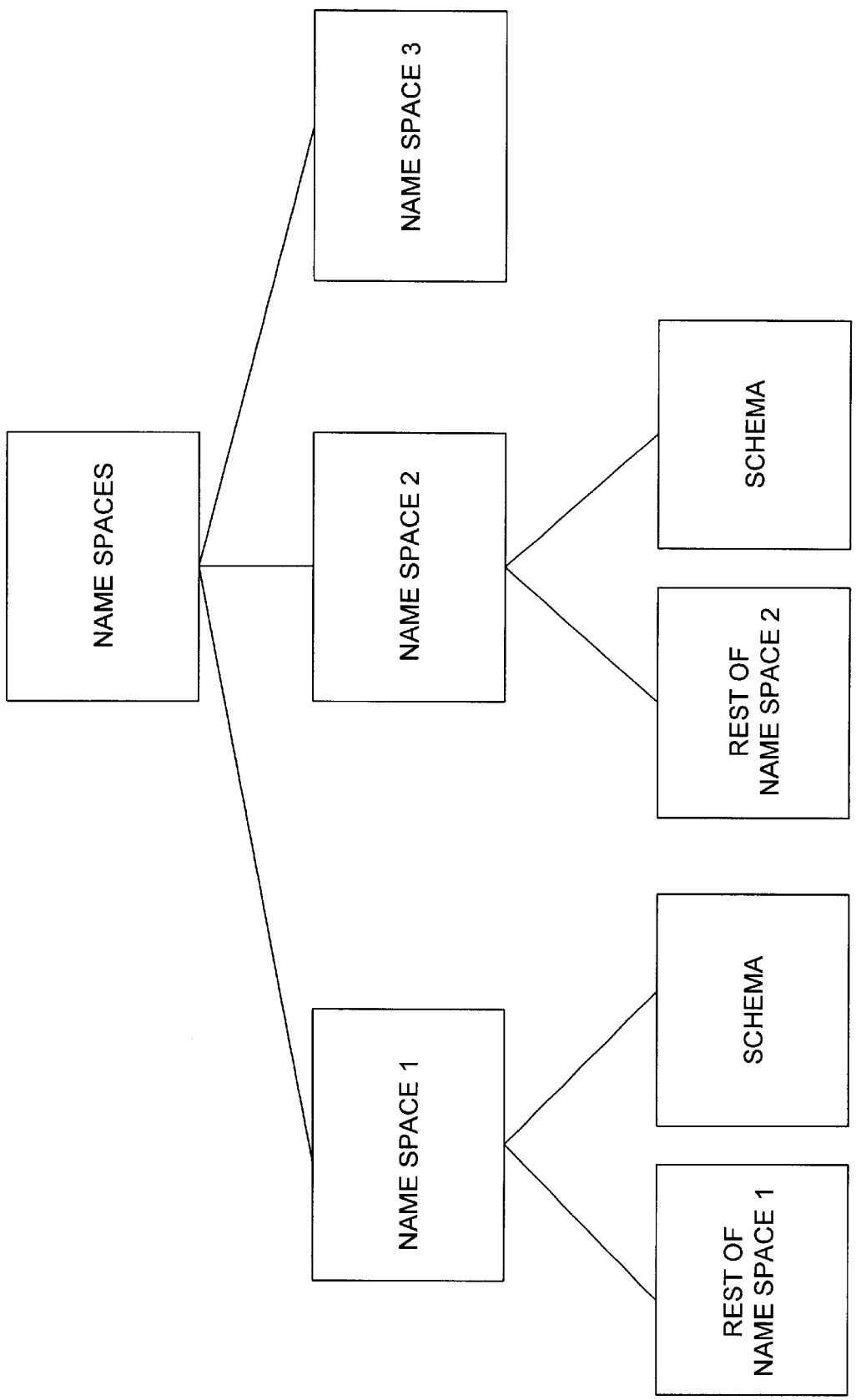
FIG. 3A illustrates the hierarchy of OleDs.
Figure 3B:
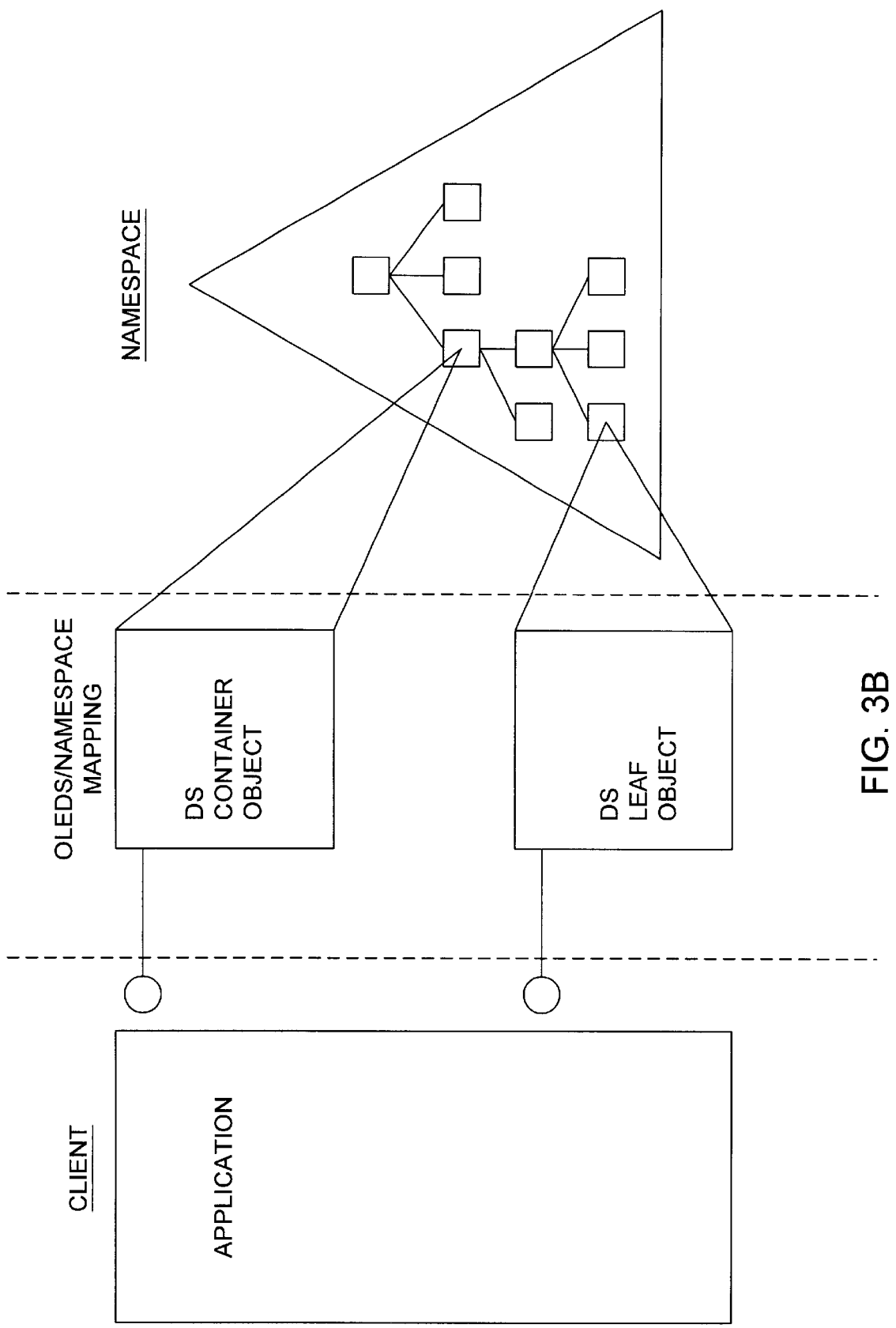
FIG. 3B illustrates the relationship between OleDs objects and their corresponding objects in a directory service.

FIG. 3A is a block diagram illustrating the hierarchy of OleDs. The hierarchy includes a root container referred to as "Namespaces." The Namespaces container logically contains the namespace of each directory service. FIG. 3B is a block diagram illustrating the architecture of OleDs. Each provider of a directory service implements a mapping of the behavior of the provider's API set to the behavior of the OleDs interfaces. Each OleDs container object corresponds to a container object in the directory service, and each OleDs leaf object corresponds to a leaf object in the directory service.

OleDs provides for both early and late binding of a client to the OleDs objects. Early binding means that the developer of a client knows at compile time the name of the properties of each object. Thus, the client can be programmed to access the values from these properties directly using methods for "getting" and "putting" properties (e.g., "get_Address" or "put_Name"). Each OleDs object exposes the IDispatch interface (defined in Ole 2.01), which allows a client to bind to property at run time (i.e., late binding).

Each OleDs object exposes the IOleDs interface. The IOleDs interface defines various attributes of the OleDs object along with methods for accessing the properties of the corresponding object in the directory service. (In the following, the term "property" refers to data within a directory service, and the term "attribute" refers to data defined by OleDs for the OleDs objects.) Each OleDs object that is a container also provides the IOleDsContainer interface. The IOleDsContainer interface defines various attributes related to container objects and methods for manipulated contained objects. In addition, each OleDs object may optionally provide an interface named IOleDs<class>or IOleDs<class>operations, where <class> corresponds to the name of the object class of the corresponding object in the directory service and <class> operations corresponds to the operations that can be performed on an object. For example, a point queue object has operations such as pausing, starting, and deleting a print job. In the following, each of these and other OleDs interfaces are defined, along with a description of a sample implementation of certain methods of the interfaces.

FIG. 4 is a block diagram of a computer system configured to implement the present invention. The computer system 400 includes a memory 401, a central processing unit 402, and I/O Interface 403, storage devices 404, and a display device 405. Various implementations of the OleDs objects are stored on a computer-readable memory, such as a disk. These implementations are loaded into the computer memory for execution. The computer memory contains clients 406, 407. The memory also contains an implementation of the OleDs objects 408, 411, 414 for three directory services. Each implementation of the OleDs objects accesses the corresponding API set of the directory services 409, 412, 415. These API sets provide access to the properties of the objects 410, 413, 416 for the underlying directory service. In addition, OleDs itself provides implementations of the binding function, the namespaces container, and various OleDs objects that correspond to typical objects of directory services.

OleDsGetObject Function

Figure 5:
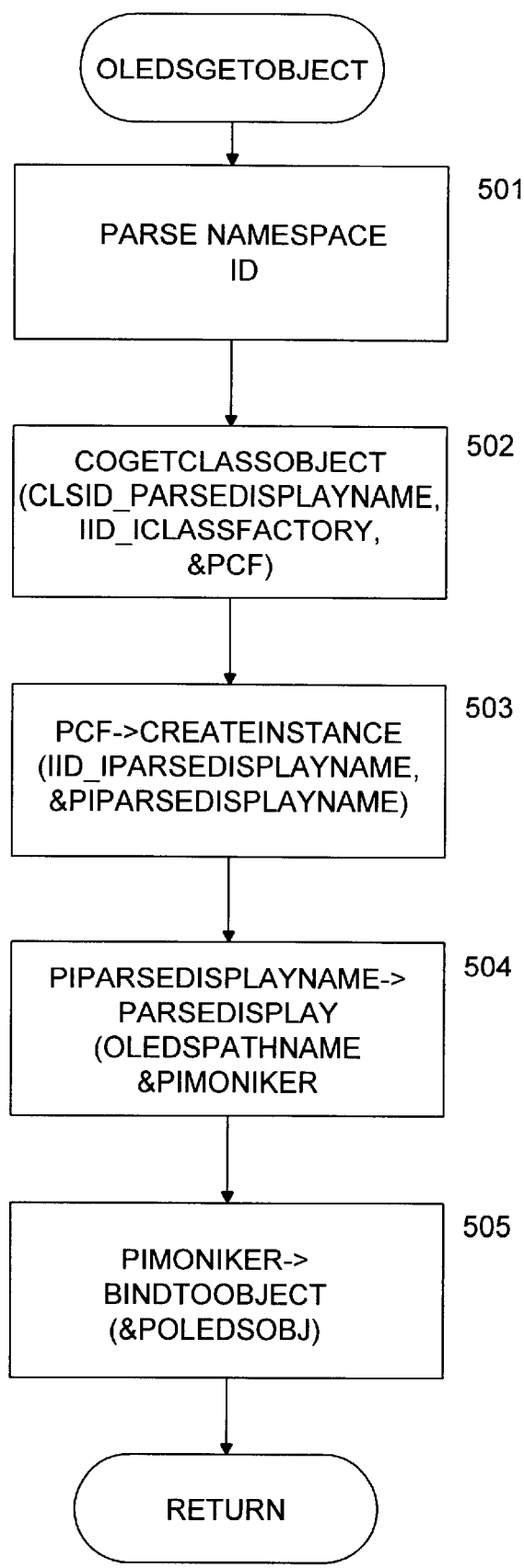
FIG. 5 is a flow diagram of the function OleDsGetObject, which is the binding function of OleDs.

FIG. 5 is a flow diagram of the function OleDsGetObject, which is the binding function of OleDs. The function OleDsGetObject is passed an OleDs path to an object and an interface identifier, and returns a pointer to the identified interface for an OleDs object that represents the object. In step 501, the function parses the namespace identifier from the OleDs path. The function uses the namespace identifier to locate the implementation of a parsing interface provided by the provider of the identified namespace. In step 502, the function calls function CoGetClassObject (defined by OLE 2.01) to retrieve a pointer to a class factory object for a ParseDisplayName class implemented by the provider of the identified namespace. The function dynamically generates the class identifier of the ParseDisplayName class for the identified namespace. For example, if the parsed namespace is "WinNTDS," then the class identifier may be "CLSID_PDNWinNTDS." The class factory object instantiates an object of the ParsedDisplayName class, which exposes the IParseDisplayName interface to be instantiated. The IParseDisplayName interface provides a method for returning a moniker to the OleDs object for the object identified by the OleDs path. In step 503, the function invokes the method IClassFactory::CreateInstance passing the identifier of the IParseDisplayName interface and receives a pointer to the IParseDisplayName interface. The method CreateInstance creates an instance of the class identified by the dynamically generated class identifier. In step 504, the function invokes the method IParseDisplayName:: ParseDisplayName passing the OleDs path. The method ParseDisplayName returns a pointer to a moniker (IMoniker interface) for the object identified by the OleDs path. In step 505, the function invokes the method IMoniker::BindToObject to retrieve a pointer to the OleDs object representing the object identified by the OleDs path. The function then returns the pointer to the OleDs object.

IOleDs Interface

The IOleDs interface defines attributes and methods common to each OleDs object. The following is the interface definition along with a description of its attributes and methods:

```
Interface IOleDs:IDispatch
{   HRESULT get_Name (string *pName);
    HRESULT get_Class (string *pClass);
    HRESULT get_GUID (string *pGUID);
    HRESULT get_OleDsPath (string *pOleDsPath);
    HRESULT get_Parent (string *pParentContainer);
    HRESULT get_Schema (string *pSchemeClassObject);
    HRESULT Access
    (IOleDsAccess **ppComponentAccessControl);
    HRESULT PropAccess
    (string PropName, IOleDsAccess
    **ppComponentAccessControl);
```

-continued

```
    HRESULT GetInfo (variant vHints);
    HRESULT SetInfo (void);
    HRESULT Get (string Name, variant *pProp);
    HRESULT Put (string Name, variant Prop);
}
```

| Name | Description |
|---|---|
| Attributes | |
| Name | Relative name of this object within the container object. |
| OleDsPath | OleDs path of this object. |
| Class | Name of the object class of this object. |
| GUID | Unique identifier for objects of this object class. |
| Parent | OleDs path of the container object of this object. |
| Schema | OleDs path of the schema object that represents this object class. |
| Methods | |
| Access | Obtains the IOleDsAccess interface (described below) of the OleDs access control object that corresponds to the security permissions on this object. |
| PropAccess | Returns a pointer to the IOleDsAccess interface of the OleDs access control dependent object that represents the access control on a property of this. |
| GetInfo | Retrieves the property values of this object from the directory service and stores them in the OleDs object. The vHints parameter allows a client to indicate which functional sets or properties should be retrieved, so the method can optimize network access. |
| SetInfo | Commits changes to this object. If properties have been changed on this object, the method writes the property values from the OleDs object to the directory service. |
| Get | Retrieves the value for a named property from the OleDs object. |
| Put | Sets the value for a named property in the OleDs object. |

Figure 6:
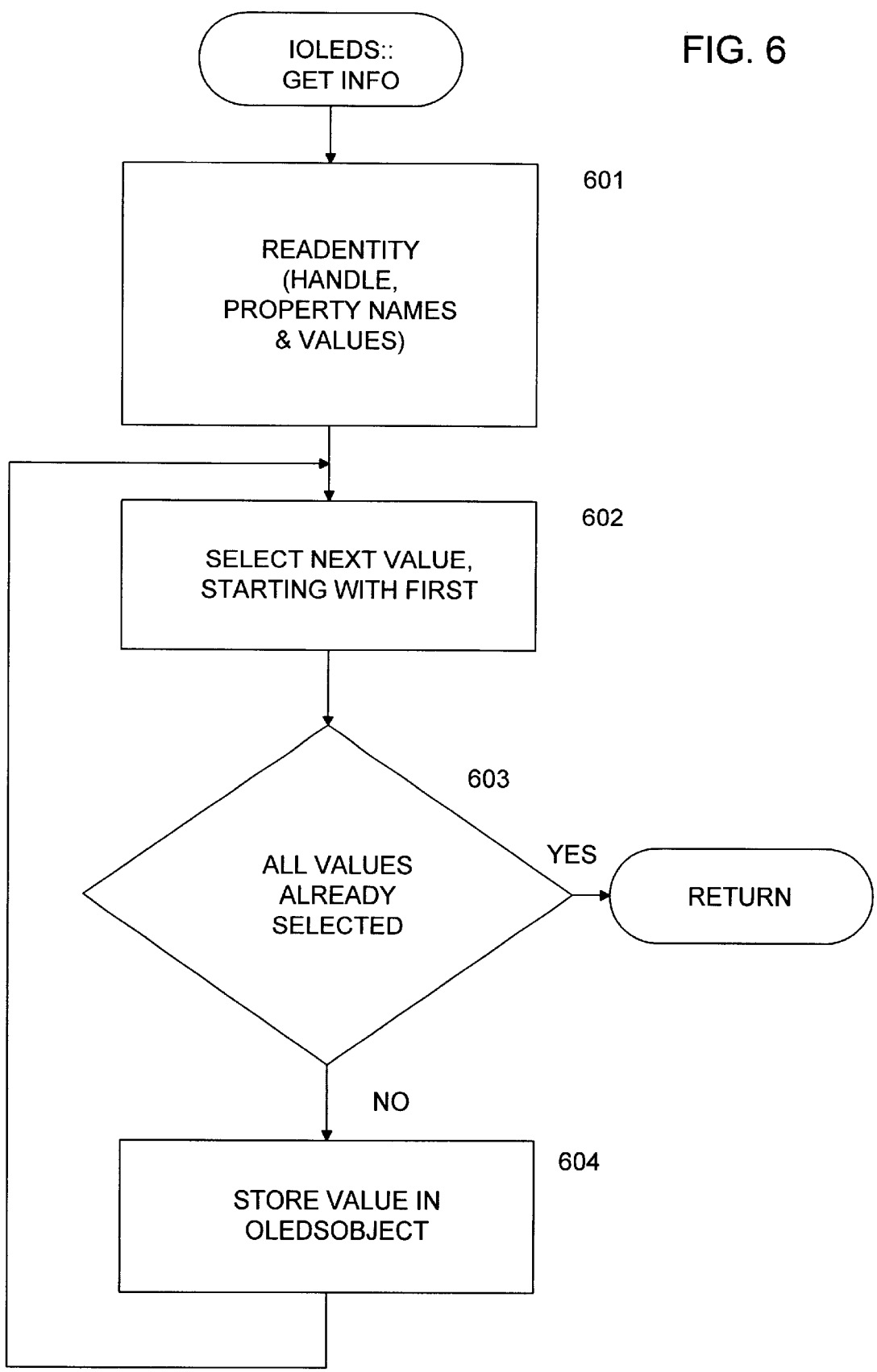
FIG. 6 is a flow diagram of the method IOleDs::GetInfo.
Figure 7:
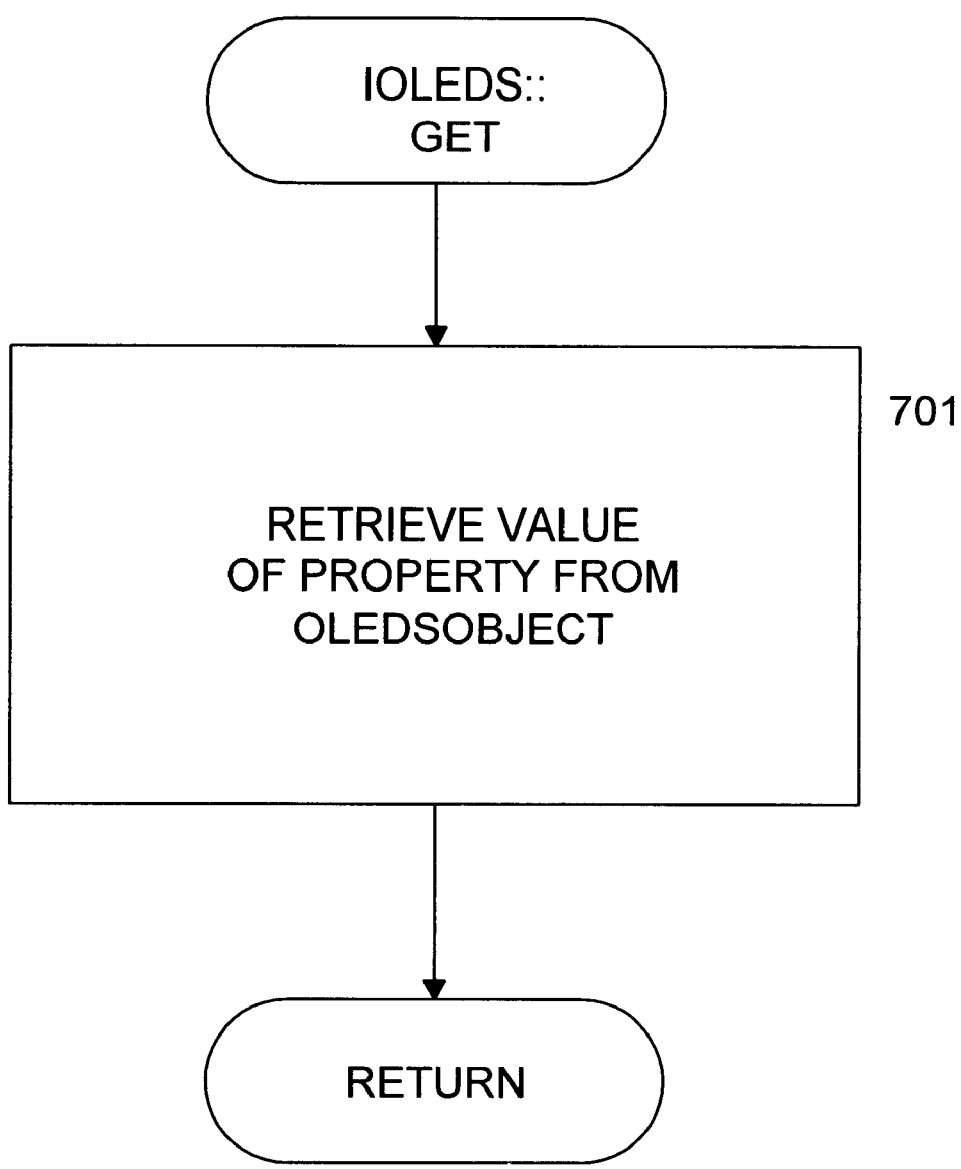
FIG. 7 is a flow diagram of the method IOleDs::Get.

FIGS. 6 and 7 illustrate implementations of methods of the IOleDs interface. FIG. 6 is a flow diagram of the method IOleDs::GetInfo. This method loads the properties for the object from the directory service into the OleDs object. OleDs defines a committing or transactioning process by which updates to properties of object are stored only in the OleDs object (using the method Put) and only stored in the directory service when a client requests (using the method Set Info). When an OleDs object is first instantiated, for example, when the function OleDsGetObject is invoked, the instantiated object would typically contain the handle that identifies the object to the API set of the directory service. In step 601, the method invokes the function ReadObject passing a handle to the object and a list of property names for the object. The function ReadObject retrieves the values for the named properties from the directory service. In an implementation of the method GetInfo for an OleDs default object, the method retrieves a list of the property names from the schema object for the object class of this object. In steps 702–704, the method loops storing the retrieved values in the OleDs object. In step 702, the method selects the next value starting with the first. In step 703, if all the values have already been selected, then the method returns, else the method continues at step 704. In step 704, the method stores the selected value into the OleDs object and loops to step 702 to select the next value.

FIG. 7 is a flow diagram of the method IOleDs::Get. The method is passed a property name, retrieves its value of the passed property from the OleDs object, and returns.

IOleDsContainer Interface

The IOleDsContainer interface defines attributes and methods common to each OleDs object that is a container. The following is the interface definition along with a description of its attributes and methods.

```
Interface IOleDsContainer:IDispatch
{
    HRESULT get_Count (long *pCount);
    HRESULT get_NewEnum (IUnknown *ppEnum);
    HRESULT get_Filter (Variant *pFilter);
    HRESULT put_Filter (Variant Filter);
    HRESULT GetObject
    (string Class, String RelativeName, IOleDs **ppNamedObject);
    HRESULT Create
    (string Class, string RelativeName, IOleDs **ppNewObject);
    HRESULT Delete (string Class, string RelativeName);
    HRESULT CopyHere
    (string SourceObject, string NewName, IOleDs **ppNewObject);
    HRESULT MoveHere
    (string SourceObject, string NewName, IOleDs **ppNewObject);
}
```

| Name | Description |
|---|---|
| | Attributes |
| Filter | Array of filters for the object classes that will be returned in a given enumeration. If Filter is empty, then all objects of all object classes are returned. Each array entry has the following format.<br>    <FilterEntry>::=<ClassName><br>        |<ClassName>.<PropName><br>        |<ClassName>.<FuncSetName><br>        |<ClassName>.<FuncSetName>.<PropName><br>        |<GUID><br>        |"Provider Specific String" |
| Count | Number of OleDs objects within the container that pass the filter. |
| _NewEnum | Enumerator of contained objects. |
| | Methods |
| GetObject | Returns the IOleDs interface of the object in this container object identified by the object class and relative name within the container object. If the object class is not passed, the method returns the interface for the first object found with that relative name. |
| Create | Creates an object of the specified object class and relative name within this container object and returns a pointer to the IOleDs interface. The object is not actually created within the directory service until the method IOleDs::SetInfo is invoked so that the mandatory properties can be set. |
| Delete | Deletes the object identified by the object class and relative name within this container object. |
| CopyHere | Creates a new object in this container object that is identical to the specified object and returns a pointer to the IOleDs interface to the new object. NewName is an optional parameter that, if present, contains the name of the new object within the container object. |
| MoveHere | Same as method CopyHere, except that the source object is deleted after copying. |

Figure 8:
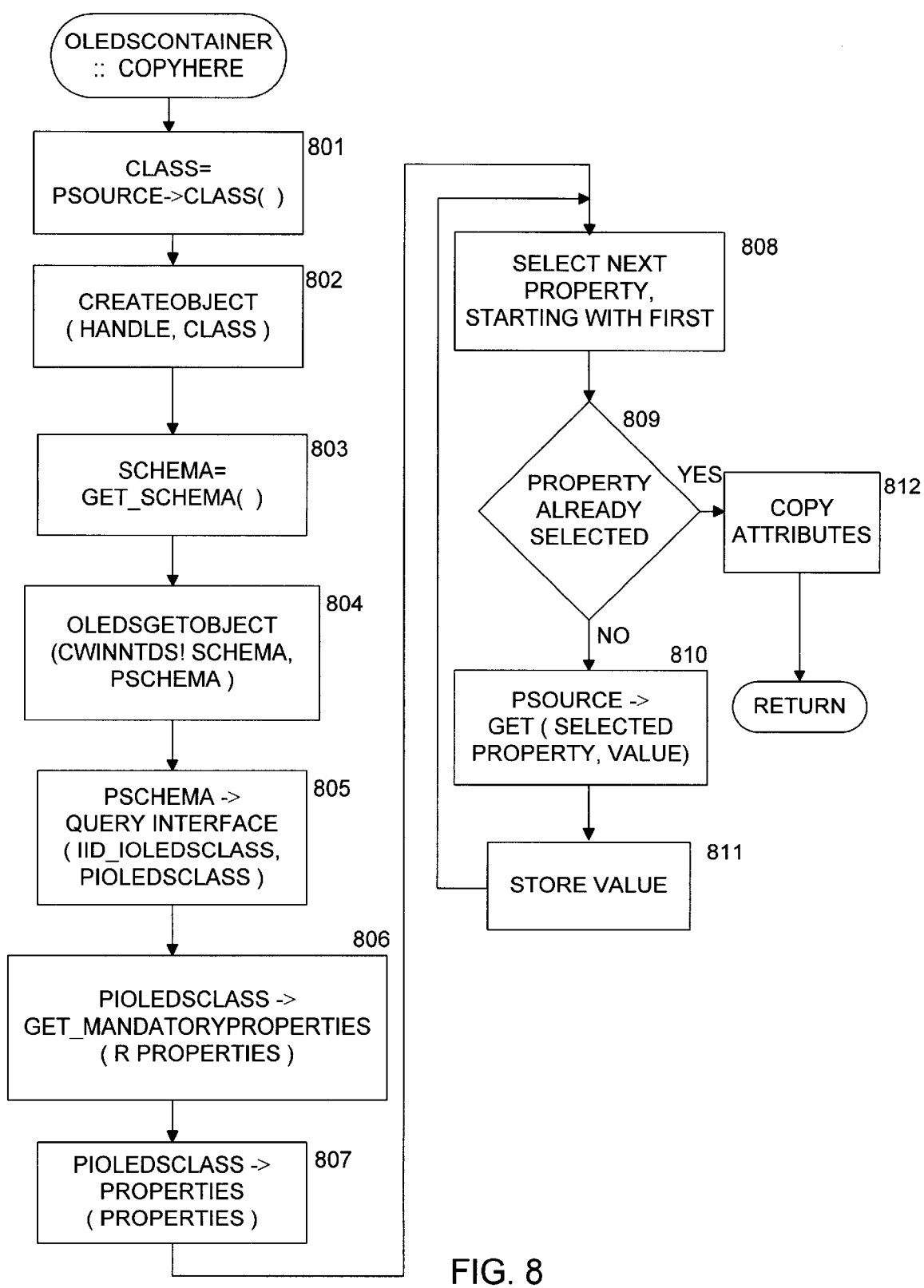
FIG. 8 is a flow diagram of the method IOleDsContainer:: CopyHere.

FIG. 8 is a flow diagram of the method IOleDsContainer::CopyHere. This method creates a copy of the specified source object within this container object. In step 801, the method determines the object class of the object to be copied. In step, 802, the method creates an object in the directory service of the determined object class by invoking the function CreateObject. In step 803, the method retrieves the OleDs path to the schema object for the object class. In step 804, the method invokes the function OleDsGetObject passing the OleDs path to the schema object, and retrieves a pointer to the IOleDs interface of OleDs schema object. In step 805, the method invokes the method IOleDs::QueryInterface of the OleDs schema object to retrieve a pointer to the IOleDsClass interface. The IOleDsClass interface provides methods for retrieving the name of the properties defined for this object class. In step 806, the method invokes the method IOleDsClass::GetMandatoryProperties to retrieve a list of the mandatory properties of this schema class. In step 807, the method invokes the method IOleDs::Properties to retrieve any additional properties for this class. In steps 808–811, the method loops copying each of the values of the properties from the source OleDs object to the destination OleDs object. In step 808, the method selects the next property starting with the first. In step 809, if all the properties have already been selected, then the method continues at step 812, else the method continues at step 810. In step 810, the method invokes the method IOleDs::Get of the source OleDs object to retrieve the value for the selected property. In step 811, the method stores the retrieved value in the destination IOleDs object and loops to step 808 to select the next property. In step 812, the method copies the attributes of the source OleDs object to the destination OleDs object, and returns.

Figure 9:
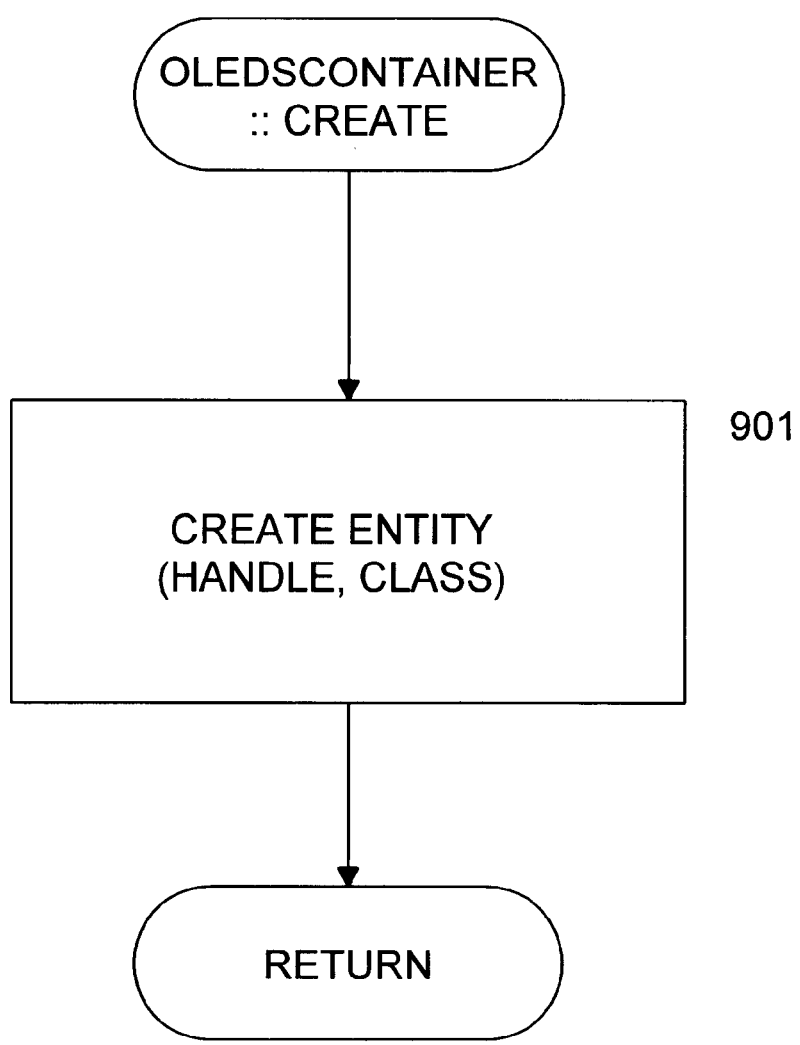
FIG. 9 is a flow diagram of the method IOleDs::Create.

FIG. 9 is a flow diagram of the method IOleDs::Create. In step 901, the method invokes the function CreateObject of the directory service passing an object class and receives a handle to a newly created object of that object class.

IOleDsClass Interface

The IOleDsClass interface is exposed by an OleDs schema object to provide access to the definition of the object class. The following is the interface definition along with a description of its attributes and methods.

```
{
    HRESULT get_PrimaryInterface (string *GUID);
    HRESULT get_CLSIC (string CLSID);
    HRESULT put_CLSID (string CLSID);
    HRESULT get_OID (string *OID);
    HRESULT put_OID (string OID);
    HRESULT get_Abstract (boolean *Abstract);
    HRESULT put_Abstract (boolean Abstract);
    HRESULT get_MandatoryProperties (Variant *Mandatory);
    HRESULT put_MandatoryProperties (Variant Mandatory);
    HRESULT get_DerivedFrom (Variant *pDerivedFrom);
    HRESULT put_DerivedFrom (Variant DerivedFrom);
    HRESULT get_Containment (Variant *pContainment);
    HRESULT put_Containment (Variant Containment);
    HRESULT get_Container (boolean *pContainer);
    HRESULT put_Container (boolean Container);
    HRESULT get_HelpfileName (string *pHelpFile);
    HRESULT put_HelpFileName (string HelpFile);
    HRESULT get_HelpFileContext (long *pHelpContext);
    HRESULT put_HelpFileContext (long HelpContext);
    HRESULT Attributes (IOleDsCollection **ppAttributes)
}
```

| Name | Description |
|---|---|
| | Attributes |
| CLSID | CLSID of the code implementing the OLE DS object for this object class. |
| OID | Namespace-specific object identifier defining this object class. This is provided to allow schema extension via OLE DS in namespaces that require namespace-specific OIDs for object classes. |
| Abstract | Boolean value indicating whether this object class is abstract. |
| Mandatory Properties | List of the properties that must be set for this object class to be written to storage. |
| Primary Interface | The primary interface identifier for objects of this object class. This is the IID for the interface defining the class, for example, the "user" class if defined by supporting IOleDsUser. |
| DerivedFrom | Array of OleDs path strings that indicate the immediate superclasses from which this object class was derived. |
| Container | Property that determines if this object class is a container. |

-continued

| | |
|---|---|
| HelpFileName | Name of a help file that contains further information about objects of this object class. |
| HelpFileContext | Context ID inside HelpFileName where specific information on this object class can be found. |
| | Method |
| Attributes | Returns a collection of OleDs objects describing additional attributes of this property. Attribute objects are provider-specific. |

IOleDsProperty Interface

OleDs defines an OleDs property object that corresponds to each property of an object class. An OleDs property object exposes an interface for retrieving the definition of the property. The following is the definition of the interface along with a description of the attributes and methods.

```
interface IOleDsProperty:IOleDs
{
    HRESULT get_OleDsNames (Variant *pOleDsNames);
    HRESULT get_DsNames (Variant *pDsName);
    HRESULT get_OID (string OID);
    HRESULT put_OID (string *OID);
    HRESULT get_Syntax (string *pSyntax);
    HRESULT put_Syntax (string Syntax);
    HRESULT get_MaxRange (long *pMaxRange);
    HRESULT put_MaxRange (long MaxRange);
    HRESULT get_MinRange (long *pMinRange);
    HRESULT put_MinRange (long MinRange);
    HRESULT get_MultiValued (long *pMultiValued);
    HRESULT put_MultiValued (long MultiValued);
    HRESULT Attributes (IOleDsCollection **ppAttributes)
};
```

| Name | Description |
|---|---|
| | Attributes |
| OleDsNames | Array of strings containing the names by which OleDs can access this property. |
| DsNames | Array of strings containing the names by which the underlying namespace can access this property. |
| OID | The namespace-specific object identifier defining this property. |
| Syntax | Relative path of the schema syntax object defining the syntax of this property. Relative to the current schema container. |
| MaxRange | Upper limit of values assigned to the property. |
| MinRange | Lower limit of values assigned to the property. |
| Normal | Value that determines if this property should be replicated normally. |
| MultiValued | Value that determines if this property is multi-valued. |
| | Method |
| Attributes | Returns a collection of OLE DS objects describing additional attributes of this property. |

IOleDs<Class> Interface

OleDs defines that every object class can support an interface named IOleDs<class>, where <class> is the name of the object class. This interface has a method, each functional set supported by the object class, that returns a pointer to an OleDsFunctionalSet object for that functional set. The following is a description of a sample functional set interface.

```
Interface IOleDsUser:IOleDs
{
    HRESULT get_BusinessInfo
    (IOleDs FS UserBusinessInfo **ppFuncSet);
};
```

OleDs Object Class Definitions

OleDs defines various object classes for both container and leaf objects.

The following object classes are defined for container objects by OleDs:

Namespaces

Namespace

Country

Locality

Organization

Domain

Organizational Unit

Computer

File Service

The following object classes are defined for leaf objects by OleDs:

User

Group

Alias

Service

Print Queue

Print Job

Print Device Session

Resource

File Share

The namespaces object is a container of the namespace objects. The implementation of the namespaces object is part of OleDs. The namespaces object exposes the IOleDs namespaces interface. This interface is shown below.

```
Interface IOleDsNamespaces:IOleDs
{
    get_DefaultContainer (string * pDefault);
    set_DefaultContainer (string Default);
}
```

The namespace object is a container object that is the source of all OleDs objects for a given namespace. The country object is a container object with properties that relate to a country. The locality object is a container object with properties that relate to a locality (e.g., state). The following is a definition of an interface for getting and setting the properties of a locality object.

```
Interface IOleDsFSLocalityGeneralInfo:IDispatch
{
    HRESULT get_Description (string *Description);
    HRESULT put_Description (string Description);
    HRESULT get_LocalityName (string LocalityName);
    HRESULT put_LocalityName (string LocalityName);
    HRESULT get_PostalAddress (string *pPostalAddress);
    HRESULT put_PostalAddress (string PostalAddress);
    HRESULT get_SeeAlso (VARIANT *pSeeAlso);
```

-continued

```
    HRESULT put_SeeAlso (VARIANT Also);
    HRESULT Access (IOleDsAccess **ppFuncSetAccessControl);
    HRESULT PropAccess
    (string PropName, IOleDsAccess **ppPropAccessControl);
};
```

| Name | Description |
|---|---|
| | Method |
| Access | Returns a pointer to the IOleDsAccess interface on the Access Control dependent object that represents the access control on this interface. |
| PropAccess | Returns a pointer to the IOleDsAccess interface on the Access Control dependent object that represents the access control on a property on this interface, as indicated by PropName. |
| | Attributes |
| Description | Text that describes the Locality. |
| LocalityName | Locality name. The locality name identifies a geographical area in which the container is physically located. |
| Postal Address | Main postal address of the locality. |
| SeeAlso | Array of names of other directory objects which may be relevant to this object. |

Each of the OleDs-defined object classes define properties related to objects of that object class. The domain object corresponds to a domain in a computer system and has functional set with properties (e.g., passwords) relating to the domain object. The organizational unit object corresponds to an entity, such as a company. The computer object corresponds to a computer in a domain. The user object has a business information, account restrictions, account statistics, and other information functional set to describe a user. The business information functional set contains properties relating to the description of a business such as the country, division, department, manager, office locations. The account restrictions functional set includes properties describing the general characteristics of the user's account, such as account disabled, number of hours in which the user is allowed to log in, etc. The account statistics functional set has property specifying statistics of the user's account, such as last time the password was changed and the last time the user logged into the account. The other info functional set contains properties relating to miscellaneous user information such as email address, home directory.

Example Client of OleDs

Figure 10:
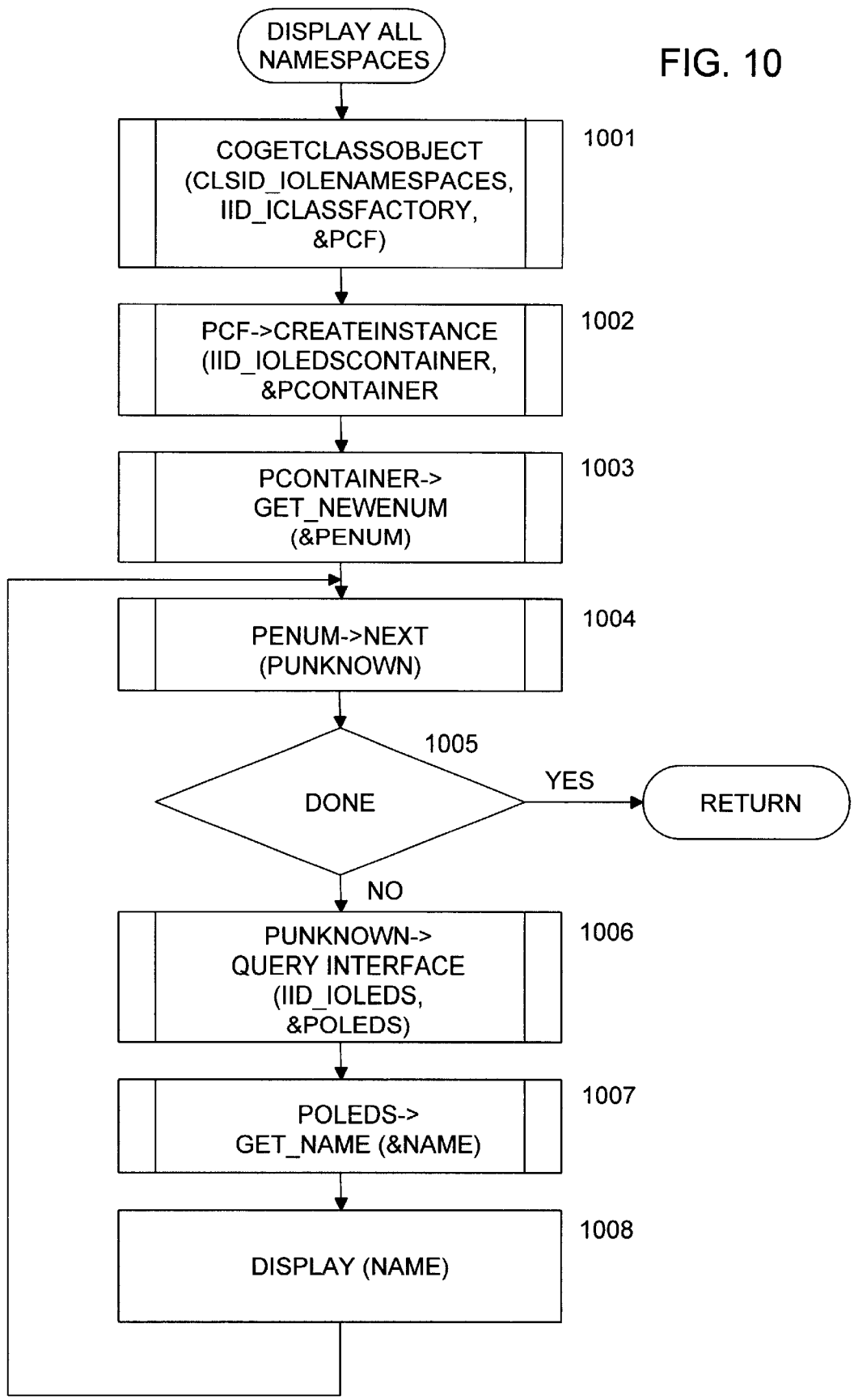
FIG. 10 is a flow diagram of the procedure to display all namespaces.

FIG. 10 is a flow diagram of the procedure to display all namespaces. This procedure illustrates how a client of OleDs would retrieve the names of all the namespaces. In step 1001, the procedure invokes the function CoGetClassObject passing the class for the OleDs namespaces object and the interface identifier for the IClassFactory interface. The function returns a pointer to a class factory interface for the OleDs namespaces object. In step 1002, the procedure invokes the method IClassFactory::CreateInstance, passing the interface identifier for the IOleDsContainer interface. The method creates an instance of the OleDs namespaces object and returns a pointer to the IOleDsContainer interface. In step 1003, the procedure invokes the method IOleDsContainer::get_NewEnum to retrieve an enumerator for the namespaces object. In step 1004–1008, the procedure loops enumerating each namespace and displays the namespace. In step 1004, the procedure invokes the method IEnumerator::Next to retrieve a pointer to the IUnknown interface for a namespace object. In step 1005, if all the namespaces have already been enumerated, then the procedure returns, else the procedure continues at step 1006. In step 1006, the procedure invokes the method IUnknown::QueryInterface to retrieve a pointer to the IOleDs interface for the namespace object. In step 1007, the procedure invokes the method IOleDs::get_Name to retrieve the name associated with the namespace object. In step 1008, the procedure displays the retrieved name and then loops to step 1004 to enumerate the next namespace object.

Although the present invention has been described in terms of a preferred embodiment, it is not intended that the invention be limited to this embodiment. Modifications within the spirit of the invention will be apparent to those skilled in the art. The scope of the present invention is defined in the claims that follow.

What is claimed is:

1. A method in a computer system for copying to a selected container object in a directory system a selected object in the directory system, the selected object having a name, comprising:

obtaining a pointer to an OleDsContainer object representing the selected container object; and using the obtained pointer to invoke a CopyHere method of the OleDsContainer object to create in the selected container object a copy of the selected object, passing in the name of the selected object and receiving in return a pointer to an OleDs object representing the copy of the selected object.

2. A method in a computer system for accessing a selected object in a directory service, the selected object having a name within the directory service, comprising:

invoking an implementation of an IParseDisplayName::ParseDisplayName method, passing in the name of the selected object within the directory service and receiving in return a moniker corresponding to an OleDs object representing the selected object; and using the received moniker to access the selected object via the OleDs object.

3. The method of claim 2 wherein the using step comprises:

invoking an implementation of an IMoniker::BindToObject method, passing in the received moniker and receiving in return a pointer to the OleDs object; and using the received pointer to access the selected object via the OleDs object.

4. A method in a computer system for reading information from a selected object in a directory service, comprising:

obtaining a pointer to an OleDs object representing the selected object;

using the obtained pointer to invoke a GetInfo method of the OleDs object to transfer information from the selected object into the OleDs object; and using the obtained pointer to invoke a Get method of the OleDs object to read information from the OleDs object.

5. The method of claim 4 wherein the selected object has properties each having a name and a value, and wherein the GetInfo method, when invoked transfers the values of the properties of the selected object into the OleDs object, and wherein the step of invoking the Get method passes in the name of a property of the selected object and receives in return the value of the property having the passed name.

6. A method in a computer system for writing information to a selected object in a directory service, comprising:

obtaining a pointer to an OleDs object representing the selected object;

using the obtained pointer to invoke a Put method of the OleDs object to transfer information into the OleDs object, passing in the information; and using the obtained pointer to invoke a SetInfo method of the OleDs object to transfer the information from the OleDs object into the selected object.

7. The method of claim 6 wherein the selected object has properties each having a name and a value, and wherein the step of invoking the Put method passes in the name of a property of the selected object and a value for the property having the passed name, and wherein the SetInfo method, when invoked, transfers to the selected object the passed value for the property having the passed name to set the property having the passed name to the passed value.

8. A method in a computer system for creating a new object in a selected container object in a directory system, the new object having a class and a name, comprising:

obtaining a pointer to an OleDsContainer object representing the selected container object; and using the obtained pointer to invoke a CopyHere method of the OleDsContainer object to create the new object in the selected container object, passing in the class and name of the new object and receiving in return a pointer to an OleDs object representing the new object.

9. The method of claim 8, further comprising:

using the returned pointer to invoke a Put method of the OleDs object to transfer information into the OleDs object, passing in the information; and using the returned pointer to invoke a SetInfo method of the OleDs object to transfer the information from the OleDs object into the new object.

10. A method in a computer system for enumerating objects contained by a selected container object in a directory system, comprising:

obtaining a pointer to an OleDsContainer object representing the selected container object;

using the obtained pointer to invoke a get_NewEnum method of the OleDsContainer object, receiving in return a pointer to an enumerator object for the selected container object; and using the received pointer to repeatedly invoke a Next method of the enumerator object, each time receiving in return a pointer to an OleDs object representing one of the objects contained by the selected container object.

11. The method of claim 10, further comprising:

using one of the returned pointers to an OleDs object to access the object contained by the container object represented by the OleDs object.

12. A method in a computer system for accessing a plurality of directory services provided by a plurality of directory service providers in a uniform manner, each directory service provider having an application programming interface, the application programming interface having a behavior for accessing objects of the directory service, wherein at least two of the directory service providers have different application programming interfaces and provide at least one directory service function having similar functionality, the method comprising:

for each of a plurality of directory service providers, installing an implementation of a pre-defined interface, the pre-defined interface defining a behavior for accessing objects of any of the directory service providers, the implementation of the pre-defined interface providing a mapping from the behavior of an application programming interface of at least one directory service provider to the behavior of the pre-defined interface;

receiving an identification of an object;

determining which directory service provider contains the identified object; and using the installed implementation of the pre-defined interface for the determined directory service provider to locate and bind to the identified object.

13. The method of claim 12 wherein each object has an object class and wherein the pre-defined interface defines a behavior for adding a definition of an object class to a directory service for any of the directory service providers.

14. The method of claim 12 wherein each object has an object class and wherein the pre-defined interface defines a behavior for retrieving a definition of an object class of a directory service for any of the director service providers.

15. The method of claim 12 wherein the pre-defined interface defines a behavior for committing changes to objects to the directory service for any of the directory service providers.

16. The method of claim 12 wherein the directory services are accessed on behalf of a client, and wherein the installed implementations of the pre-defined interface have at least one method, and wherein the using step includes the step of, by the client, invoking at least one method of the installed implementation of the pre-defined interface for the determined directory service provider.

17. The method of claim 12 wherein the directory services are accessed on behalf of a client, and wherein the installed implementations of the pre-defined interface have at least one method, and wherein the determining and using steps together include the steps of:

by the client, providing an indication of the received identification to an intermediary;

by the intermediary,
determining which directory service provider contains the identified object;
invoking at least one method of the installed implementation of the pre-defined interface for the determined directory service provider to bind to the identified object; and
providing to the client an indication of the binding to the identified object.

18. A computer-readable medium whose contents cause a computer system to copy to a selected container object in a directory system a selected object in the directory system, the selected object having a name, by:

obtaining a pointer to an intermediary container object representing the selected container object; and using the obtained pointer to invoke a CopyHere method of the intermediary container object to create in the selected container object a copy of the selected object, passing in the name of the selected object and receiving in return a pointer to an intermediary object representing the copy of the selected object.

19. A computer-readable medium whose contents cause a computer system to access a selected object in any of a plurality of directory service providers, the selected object having a name within the directory service provider by:

invoking an implementation of an IParseDisplay Name::ParseDisplayName method, passing in the name of the selected object within the directory service provider and receiving in return a moniker corresponding to an intermediary object representing the selected object; and using the received moniker to access the selected object via the intermediary object.

20. The computer-readable medium of claim 19 wherein the using step comprises:
   invoking an implementation of an IMoniker::BindToObject method, passing in the received moniker and receiving in return a pointer to the intermediary object; and
   using the received pointer to access the selected object via the intermediary object.

21. A computer-readable medium whose contents cause a computer system to read information from a selected object in a directory service by:
   obtaining a pointer to an intermediary object representing the selected object;
   using the obtained pointer to invoke a GetInfo method of the intermediary object to transfer information from the selected object into the intermediary object; and
   using the obtained pointer to invoke a Get method of the intermediary object to read information from the intermediary object.

22. The computer-readable medium of claim 21 wherein the selected object has properties each having a name and a value,
   and wherein the GetInfo method, when invoked, transfers the values of the properties of the selected object into the intermediary object,
   and wherein the step of invoking the Get method passes in the name of a property of the selected object and receives in return the value of the property having the passed name.

23. A computer-readable medium whose contents cause a computer system to write information to a selected object in a directory service by:
   obtaining a pointer to an intermediary object representing the selected object;
   using the obtained pointer to invoke a Put method of the intermediary object to transfer information into the intermediary object, passing in the information; and
   using the obtained pointer to invoke a SetInfo method of the intermediary object to transfer the information from the intermediary object into the selected object.

24. The computer-readable medium of claim 23 wherein the selected object has properties each having a name and a value,
   and wherein the step of invoking the Put method passes in the name of a property of the selected object and a value for the property having the passed name,
   and wherein the SetInfo method, when invoked, transfers to the selected object the passed value for the property having the passed name to set the property having the passed name to the passed value.

25. A computer-readable medium whose contents cause a computer system to create a new object in a selected container object in a directory system, the new object having a class and a name, by:
   obtaining a pointer to an intermediary container object representing the selected container object in the directory system; and
   using the obtained pointer to invoke a CopyHere method of the intermediary container object to create the new object in the selected container object in the directory system, passing in the class and name of the new object and receiving in return a pointer to an intermediary object representing the new object.

26. The computer-readable medium of claim 25 wherein the contents of the computer-readable medium further cause the computer system to perform the steps of:
   using the returned pointer to invoke a Put method of the intermediary object to transfer information into the intermediary object passing in the information; and
   using the returned pointer to invoke a SetInfo method of the intermediary object to transfer the information from the intermediary object into the new object.

27. A computer-readable medium whose contents cause a computer system to enumerate objects contained by a selected container object in a directory system by:
   obtaining a pointer to an intermediary container object representing the selected container object;
   using the obtained pointer to invoke a get_NewEnum method of the intermediary container object receiving in return a pointer to an enumerator object for the selected container object; and
   using the received pointer to repeatedly invoke a Next method of the enumerator object, each time receiving in return a pointer to an intermediary object representing one of the objects contained by the selected container object.

28. The computer-readable medium of claim 27 wherein the contents of the computer-readable medium further cause the computer system to perform the steps of:
   using one of the returned pointers to an intermediary object to access the object contained by the container object represented by the intermediary object.

29. A computer-readable medium whose contents cause a computer system to access a plurality of directory services provided by a plurality of directory service providers in a uniform manner, each directory service provider having an application programming interface, the application programming interface having a behavior for accessing objects of the directory service, wherein at least two of the directory service providers have different application programming interfaces and provide at least one directory service function having similar functionality, by:
   for each of a plurality of directory service providers, installing an implementation of a pre-defined interface, the pre-defined interface defining a behavior for accessing objects of any of the directory service providers, the implementation of the pre-defined interface providing a mapping from the behavior of an application programming interface of at least one directory service provider to the behavior of the pre-defined interface;
   receiving an identification of an object;
   determining which directory service provider contains the identified object; and
   using the installed implementation of the pre-defined interface for the determined directory service provider to locate and bind to the identified object.

30. The computer-readable medium of claim 29 wherein each object has an object class and wherein the pre-defined interface defines a behavior for adding a definition of an object class to a directory service for any of the directory service providers.

31. The computer-readable medium of claim 29 wherein each object has an object class and wherein the pre-defined interface defines a behavior for retrieving a definition of an object class of a directory service for any of the directory service providers.

32. The computer-readable medium of claim 29 wherein the pre-defined interface defines a behavior for committing changes to objects to the directory service for any of the directory service providers.

33. The computer-readable medium of claim 29 wherein the directory services are accessed on behalf of a client, and wherein the installed implementations of the pre-defined interface have at least one method, and wherein the using step includes the step of, by the client, invoking at least one method of the installed implementation of the pre-defined interface for the determined directory service provider.

34. The computer-readable medium of claim 29 wherein the directory services are accessed on behalf of a client, and wherein the installed implementations of the pre-defined interface have at least one method, and wherein the determining and using steps together include the steps of:

by the client, providing an indication of the received identification to an intermediary;

by the intermediary,
  determining which directory service provider contains the identified object;
  invoking at least one method of the installed implementation of the pre-defined interface for the determined directory service provider to bind to the identified object; and
  providing to the client an indication of the binding to the identified object.

\* \* \* \* \*

UNITED STATES PATENT AND TRADEMARK OFFICE
CERTIFICATE OF CORRECTION

PATENT NO. : 6,360,230 B1
DATED : March 19, 2002
INVENTOR(S) : Chan et al.

It is certified that error appears in the above-identified patent and that said Letters Patent is hereby corrected as shown below:

Column 5,
Line 7, "REFIIFD" should read -- REFIID --

Column 9,
Line 63, "pSchemeClassObject" should read -- pSchemaClassObject --

Signed and Sealed this

Fifteenth Day of June, 2004

JON W. DUDAS
*Acting Director of the United States Patent and Trademark Office*